(12) United States Patent
Levay et al.

(10) Patent No.: US 10,879,022 B1
(45) Date of Patent: Dec. 29, 2020

(54) TOGGLE SWITCH

(71) Applicants: DENSO International America, Inc., Southfield, MI (US); Denso Corporation, Kariya (JP)

(72) Inventors: Christopher Levay, Grand Rapids, MI (US); Javon Tucker, Southfield, MI (US); Praveenkumar Hanakuntimath, Farmington Hills, MI (US)

(73) Assignees: Denso International America, Inc., Southfield, MI (US); Denso Corporation, Karriya (JP)

( * ) Notice: Subject to any disclaimer, the term of this patent is extended or adjusted under 35 U.S.C. 154(b) by 0 days.

(21) Appl. No.: 16/541,668

(22) Filed: Aug. 15, 2019

(51) Int. Cl.
*H01H 23/14* (2006.01)
*H01H 23/28* (2006.01)

(52) U.S. Cl.
CPC ............ *H01H 23/14* (2013.01); *H01H 23/28* (2013.01); *H01H 2231/026* (2013.01)

(58) Field of Classification Search
CPC ........ H01H 23/14; H01H 23/20; H01H 23/24; H01H 23/28; H01H 21/12; H01H 21/22; H01H 13/24; H01H 13/14; H01H 13/023; H01H 21/36; H01H 2231/026; H01H 3/00; B60H 1/0065
USPC ........ 200/553, 5 A, 6 A, 315, 314, 339, 341
See application file for complete search history.

(56) References Cited

U.S. PATENT DOCUMENTS

| | | | | |
|---|---|---|---|---|
| 5,430,261 A * | 7/1995 | Malone | ................ | H01H 23/003 200/1 B |
| 5,693,920 A * | 12/1997 | Maeda | .................. | B60R 16/005 200/1 B |
| 6,800,825 B1 * | 10/2004 | Sasaki | .................... | H01H 21/24 200/339 |
| 6,974,918 B2 * | 12/2005 | Blossfeld | ............. | H01H 1/5805 200/284 |
| 7,009,128 B1 * | 3/2006 | Czarnecki | .............. | H01H 23/08 200/339 |
| 7,132,616 B1 * | 11/2006 | Radosavljevic | ..... | H01H 23/168 200/553 |
| 7,952,044 B2 * | 5/2011 | Lee | ...................... | H01H 23/168 200/339 |

(Continued)

FOREIGN PATENT DOCUMENTS

DE 102006040304 A1 3/2008
DE 102012018910 A1 3/2014
(Continued)

*Primary Examiner* — William A Bolton
(74) *Attorney, Agent, or Firm* — Brooks Kushman P.C.

(57) ABSTRACT

A toggle switch system for a vehicle control panel includes a first electrical switch, a toggle body, and a rocker arm. The first electrical switch is configured to activate a first vehicle function. The toggle body has a proximal end and a distal end. The toggle body is configured to pivot along an axis that is between the proximal and distal ends. The toggle has upper and lower surfaces that define a slot that extends inward from the distal end. The rocker arm has a protrusion that extends into the slot between the upper and lower surfaces. The rocker arm also has a heel that is configured to rotate, engage, and activate the first electrical switch in response to the toggle body moving in a first direction to engage the protrusion with the toggle body within the slot.

18 Claims, 4 Drawing Sheets

(56) References Cited

U.S. PATENT DOCUMENTS 8,704,118 B2 * 4/2014 Konno ................ H01H 23/162
                                                    200/339
2019/0202257 A1   7/2019 Tucker et al.

FOREIGN PATENT DOCUMENTS

EP        2492940 A1   8/2012
WO     2018147206 A1   8/2018

* cited by examiner

TOGGLE SWITCH

TECHNICAL FIELD

The present disclosure relates to a toggle switch for a vehicle control system.

BACKGROUND

Toggle switches may be utilized as an interface for various components. Toggle switches may be utilized in vehicles to activate various vehicle functions, such as climate functions, audio functions, driver settings, etc. Toggle switches may need to meet packaging requirements for vehicle interiors. Additionally, toggle switches may need to be reliable when activated. For example, when the switch is activated, it must respond to the corresponding vehicle function. Furthermore, there may be requirements for keeping costs low or to meet other various requirements of the vehicle.

SUMMARY

A toggle switch system for a vehicle control panel includes a first electrical switch, a toggle body, and a rocker arm. The first electrical switch is configured to activate a first vehicle function. The toggle body has a proximal end and a distal end. The toggle body is configured to pivot along an axis that is between the proximal and distal ends. The toggle has upper and lower surfaces that define a slot that extends inward from the distal end. The rocker arm has a protrusion that extends into the slot between the upper and lower surfaces. The rocker arm also has a heel that is configured to rotate, engage, and activate the first electrical switch in response to the toggle body moving in a first direction to engage the protrusion with the toggle body within the slot.

A toggle switch system for a vehicle includes a first electrical switch, a toggle body, and a rocker arm. The first electrical switch is configured to activate a first vehicle function. The toggle body has a toggle cap that is disposed along a proximal end of the toggle body. The toggle body has upper and lower surfaces that define a slot that extends inward from the distal end. The toggle body is configured to transition between toggle up and toggle down positions in response to upward and downward movement of the toggle cap, respectively. The rocker arm has a protrusion that extends into the slot between the upper and lower surfaces. The rocker arm also has a heel that is configured to rotate, engage, and activate the first electrical switch in response to the toggle body being transitioned to the toggle up position to engage the protrusion with the toggle body within the slot.

A toggle switch system for a vehicle includes a first electrical switch, a second electrical switch, a toggle body, a first rocker arm, and a second rocker arm. The first and second electrical switches are configured to activate first and second vehicle functions, respectively. The toggle body has a toggle cap disposed along a proximal end of the toggle body. The toggle body defines first and second slots that extend inward from a distal end of the toggle body between upper and lower surfaces. The first rocker arm has a first protrusion that extends into the first slot. The first rocker arm also has a first heel that is configured to rotate, engage, and activate the first electrical switch in response to an upward movement of the toggle cap to engage the first protrusion with the toggle body within the first slot. The second rocker arm has a second protrusion that extends into the second slot. The second rocker arm also has a second heel that is configured to rotate, engage, and activate the second electrical switch in response to a downward movement of the toggle cap to engage the second protrusion with the toggle body within the second slot.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
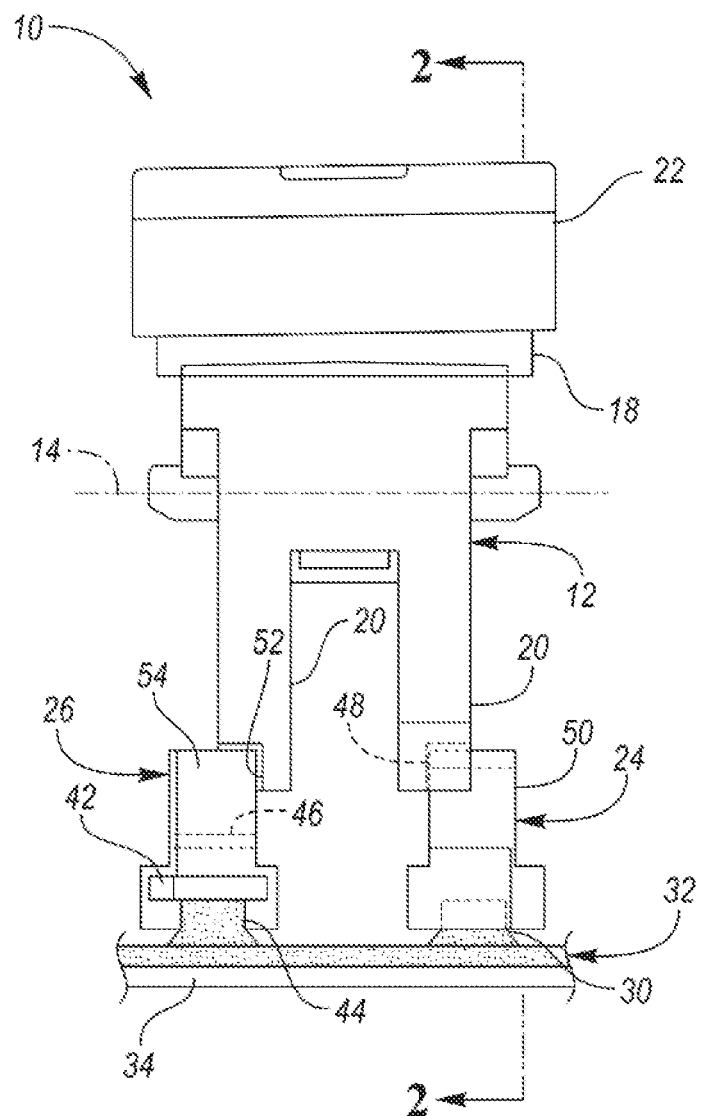
FIG. 1 is a top view of a toggle switch system for a vehicle or more specifically for a vehicle control panel.
Figure 2A:
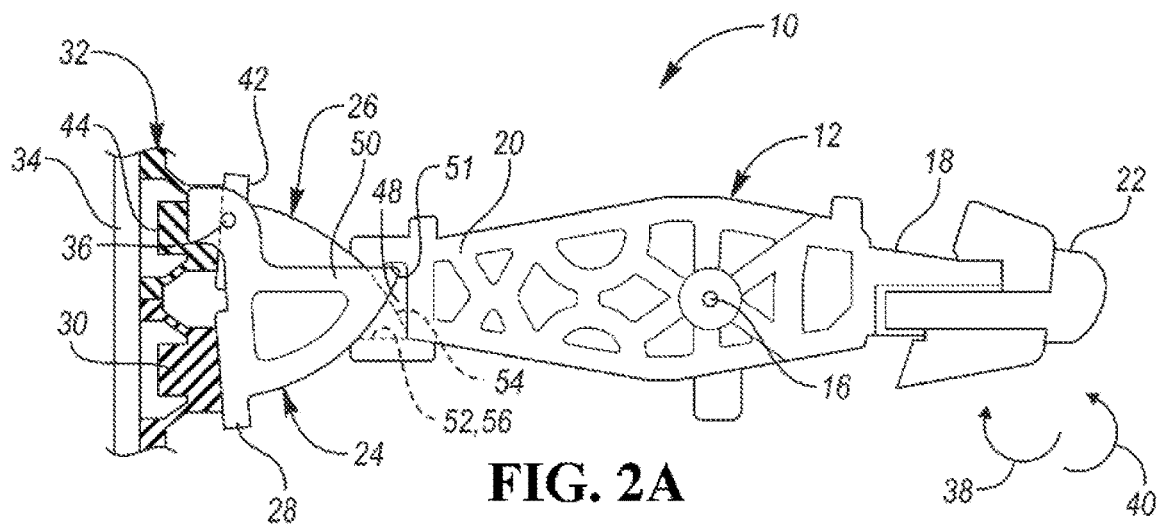
FIG. 2A is a side view of the toggle switch system in a neutral or nominal position.
Figure 2B:
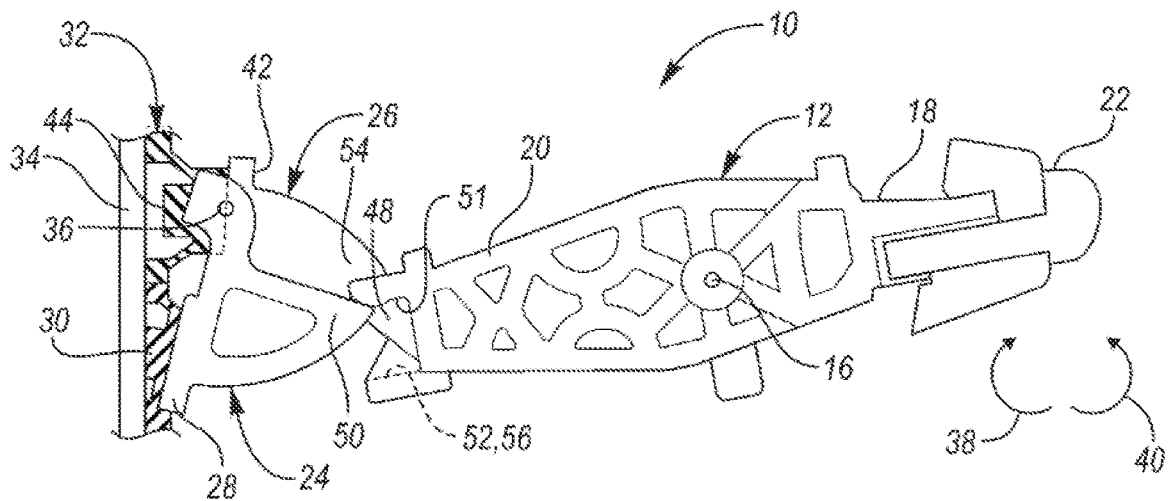
FIG. 2B is a side view of the toggle switch system in a toggle up position.
Figure 2C:
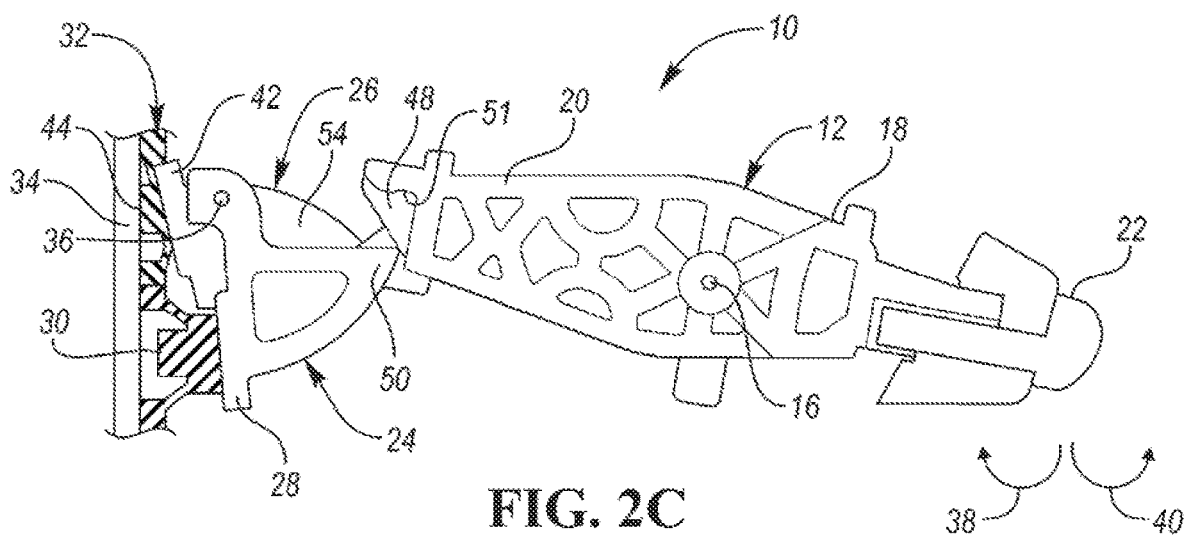
FIG. 2C is a side view of the toggle switch system in a toggle down position.

Referring to FIGS. 1-2C, a toggle switch system 10 for a vehicle, or more specifically for a vehicle control panel, is illustrated. The toggle switch system 10 may be utilized to activate any number of vehicle functions. For example, the toggle switch system 10 may be utilized to activate functions related to climate control, such as temperature controls (e.g. temperature up or temperature down), fan speed (e.g fan speed up/fan speed down), air recirculation, air conditioning (A/C) mode, etc. The toggle switch system 10 may also be utilized for various audio functions. For example, the toggle switch system 10 may be utilized to seek up/seek down, tune up/tune down, volume up/volume down, search a track list, etc. The toggle switch system 10 may also be utilized to control various multimedia displays (e.g. navigation display, dashboard display, etc.) in the vehicle cabin. In sum, the vehicle functionality of the toggle switch is not limited to any specific vehicle function.

The toggle switch system 10 includes a toggle body 12 that is configured to pivot along an axis 14 of a first pin 16. The first pin 16 may be secured to a static structure such as a housing of the control panel that toggle switch system 10 is a subcomponent of or may be secured directly to a dashboard of a vehicle. The toggle body 12 includes a proximal end 18 and a distal end 20. A toggle cap 22 is disposed on and secured to the proximal end 18 of the toggle body 12. The toggle body 12 may be biased toward a neutral or nominal position (see FIG. 2A) such that the toggle body 12 returns to the neutral or nominal position when it is not being forced into a toggle up position (see FIG. 2B) or a toggle down position (see FIG. 2C). The toggle body 12 may be biased toward the neutral or nominal position via the switches of a rubber switch mat and rocker arms that connect the switches of the rubber switch mat to the toggle body 12, which is described in more detail below. The switches may be biased toward a specific position by a biasing element (e.g., a spring) which is translated by the rocker arms and back to the toggle body 12.

The toggle switch system 10 also includes a first rocker arm 24 and a second rocker arm 26. The first rocker arm 24 includes a first heel 28 that is located along a bottom end of the first rocker arm 24. The first heel 28 is configured to engage a first electrical switch 30 in order to activate a first vehicle function, which may be any of the functions listed above or any other vehicle function that may be controlled via the toggle switch system 10. The first electrical switch 30 may be a tact switch or may be part of a rubber switch mat 32 that is mounted to an exterior surface of a printed circuit board 34 that controls one or more vehicle functions. For illustrative purposes, the rubber switch mat 32 is shown as a cross-section in FIGS. 2A-2C that includes steps. More specifically, the steps in the cross-sections allow the first electrical switch 30 and the second electrical switch 44 to be illustrated in cross-sectional views even though they are located at different depths within FIGS. 2A-2C. Engagement between the first electrical switch 30 and the printed circuit board 34 initiates control of the first vehicle function.

The first rocker arm 24 may be configured to pivot along an axis of a second pin 36. The second pin 36 may also be secured to a static structure such as the housing of the control panel that toggle switch system 10 is a subcomponent of or to the vehicle dashboard. More specifically, the first rocker arm 24 may be configured to rotate, engage, and activate the first electrical switch 30 in response to rotation of the first rocker arm 24 about the second pin 36 in a first direction 38 that results in the first heel 28 engaging the first switch 30 (see FIG. 2B). Rotation of the first rocker arm 24 in a second direction 40, that is opposite to the first direction 38, results in the first rocker arm 24, or more specifically the first heel 28, disengaging and deactivating the first electrical switch 30. The first rocker arm 24 may be biased via the first electrical switch 30, which may be spring loaded, toward a neutral or nominal position (see FIG. 2A) such that the first rocker arm 24 returns to the neutral or nominal position when it is not being forced into engagement with the first switch 30.

The second rocker arm 26 includes a second heel 42 that is located along a top end of the second rocker arm 26. The second heel 42 is configured to engage a second electrical switch 44 in order to activate a second vehicle function, which may be any of the functions listed above or any other vehicle function that may be controlled via the toggle switch system 10. The second electrical switch 44 may be a tact switch or may be part of the rubber switch mat 32 that is mounted to the exterior surface of the printed circuit board 34. Engagement between the second electrical switch 44 and the printed circuit board 34 initiates control of the second vehicle function.

The second rocker arm 26 may be configured to pivot along an axis of a third pin 46. The third pin 46 may also be secured to a static structure such as the housing of the control panel that toggle switch system 10 is a subcomponent of or to the vehicle dashboard. More specifically, the second rocker arm 26 may be configured to rotate, engage, and activate the second electrical switch 44 in response to rotation of the second rocker arm 26 about the third pin 46 in the second direction 40 resulting in the second heel 42 engaging the second switch 44 (see FIG. 2C). Rotation of the second rocker arm 26 in the first direction 38 results in the second rocker arm 26, or more specifically the second heel 42, disengaging and deactivating the second electrical switch 44. The second rocker arm 26 may be biased via the second electrical switch 44, which may be spring loaded, toward a neutral or nominal position (see FIG. 2A) such that the second rocker arm 26 returns to the neutral or nominal position when it is not being forced into engagement with the second switch 44.

The toggle body 12 defines a first slot 48 that extends inward from the distal end 20 of the toggle body 12. An end 50 of the first rocker arm 24 that extends away from the first heel 28 extends into the first slot 48. The end 50 of the first rocker arm 24 may rest against an upper surface 51 of the toggle body 12 that partially defines the first slot 48 when the toggle body 12 and the first rocker arm 24 are in the neutral or nominal position (see FIG. 2A). The toggle body 12 also defines a second slot 52 that extends inward from the distal end 20 of the toggle body 12. An end 54 of the second rocker arm 26 that extends away from the second heel 42 extends into the second slot 52. The end 54 of the second rocker arm 26 may rest against a lower surface 56 of the toggle body 12 that partially defines the second slot 52 when the toggle body 12 and the second rocker arm 26 are in the neutral or nominal position (see FIG. 2A).

When a user to adjusts the position of the toggle body 12 to the toggle up position by pushing the toggle cap 22 upward (see FIG. 2B), the toggle body 12 is rotated in the second direction 40 such that the distal end 20 of the toggle body 12, or more specifically the upper surface 51 of the toggle body 12 that partially defines the first slot 48, engages the end 50 of the first rocker arm 24 resulting in the first rocker arm 24 rotating in the first direction 38 such that the first heel 28 engages the first electrical switch 30 to activate the first vehicle function. This results in a disengagement between the distal end 20 of the toggle body 12, or more specifically the lower surface 56 of the toggle body 12 that partially defines the second slot 52, and the end 54 of the second rocker arm 26. When a user releases the toggle cap 22 from the toggle up position, the toggle body 12 and the first rocker arm 24 may return the neutral or nominal position (see FIG. 2A) since the toggle body 12 and the first rocker arm 24 are biased toward the neutral or nominal position. This may result in an impact between the distal end 20 of the toggle body 12, or more specifically the lower surface 56 of the toggle body 12 that partially defines the second slot 52, and the end 54 of the second rocker arm 26, which may cause undesirable noise.

When a user to adjusts the position of the toggle body 12 to the toggle down position by pushing the toggle cap 22 downward (see FIG. 2C), the toggle body 12 is rotated in the first direction 38 such that the distal end 20 of the toggle body 12, or more specifically the lower surface 56 of the toggle body 12 that partially defines the second slot 52, engages the end 54 of the second rocker arm 26 resulting in the second rocker arm 26 rotating in the second direction 40 such that the second heel 42 engages the second electrical switch 44 to activate the second vehicle function. This results in a disengagement between the distal end 20 of the toggle body 12, or more specifically the upper surface 51 of the toggle body 12 that partially defines the first slot 48, and the end 50 of the first rocker arm 24. When a user releases the toggle cap 22 from the toggle down position, the toggle body 12 and the second rocker arm 26 may return the neutral or nominal position (see FIG. 2A) since the toggle body 12 and the second rocker arm 26 are biased toward the neutral or nominal position. This may result in an impact between the distal end 20 of the toggle body 12, or more specifically the upper surface 51 of the toggle body 12 that partially defines the first slot 48, and the end 50 of the first rocker arm 24, which may cause undesirable noise.

Figure 3:
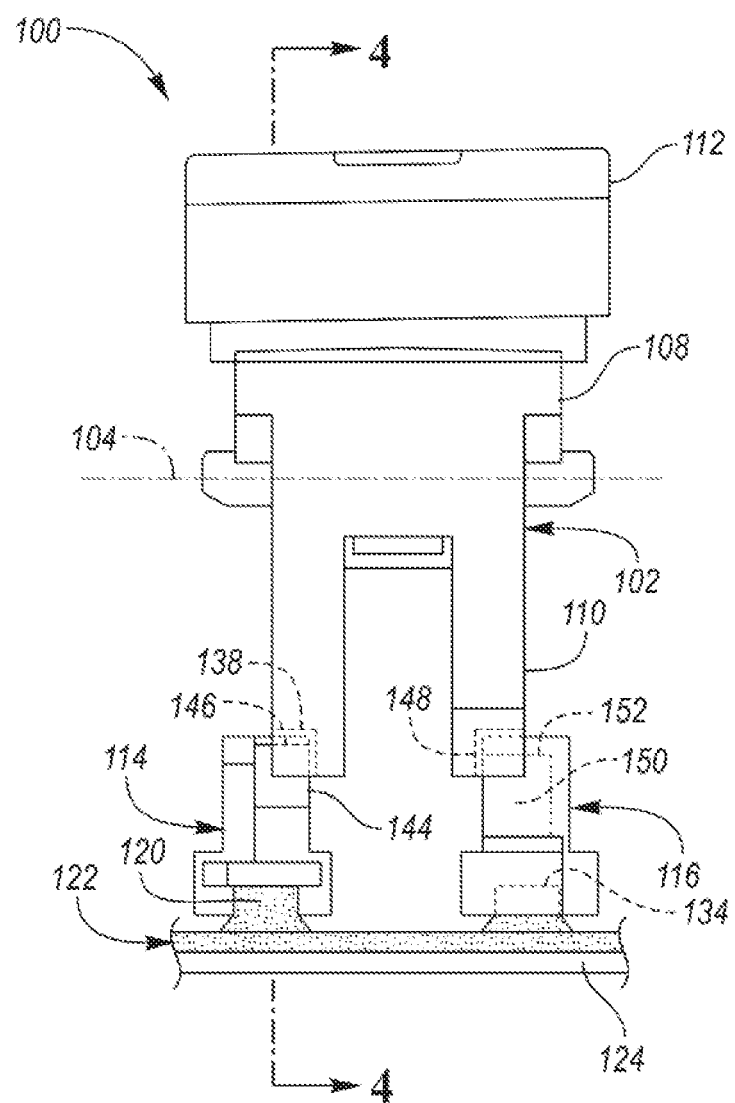
FIG. 3 is a top view of an updated embodiment of the toggle switch system.
Figure 4A:
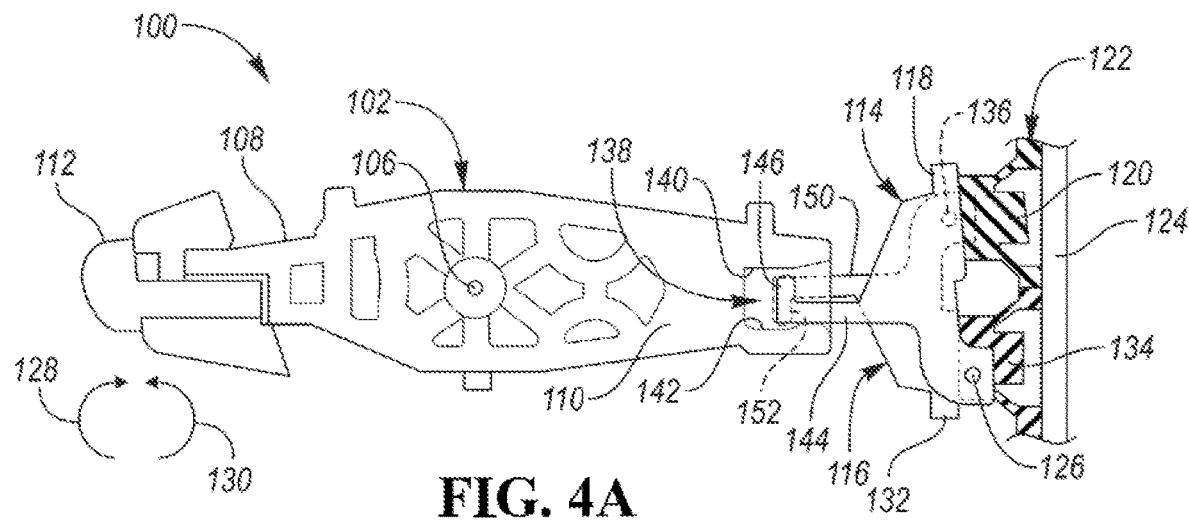
FIG. 4A is a cross-sectional view of the updated embodiment of the toggle switch system taken along line 4-4 in FIG. 3 with the toggle switch system in the neutral or nominal position.
Figure 4B:
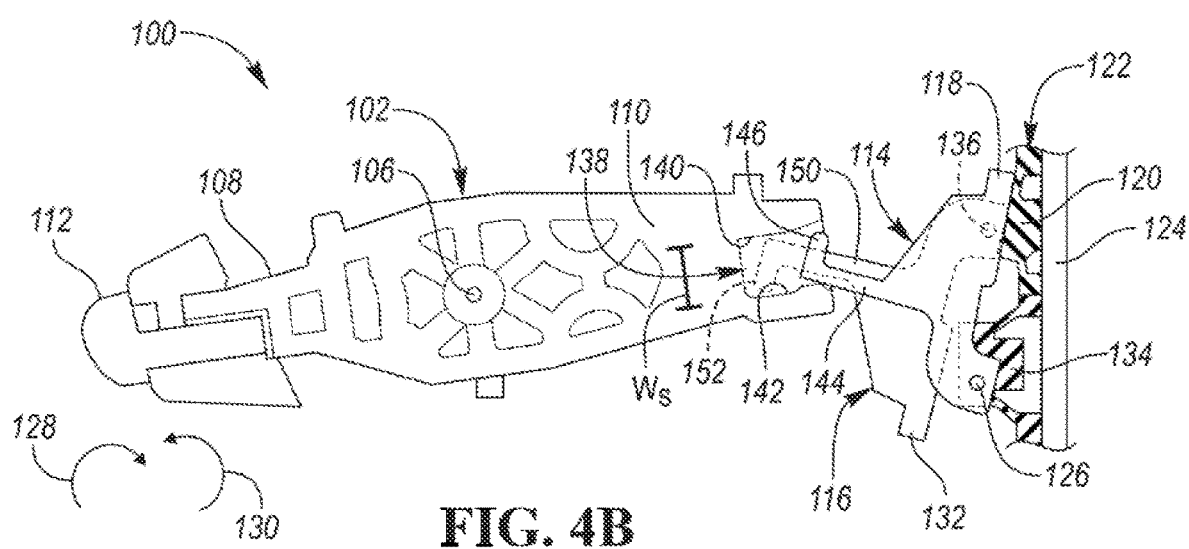
FIG. 4B is a cross-sectional view of the updated embodiment of the toggle switch system taken along line 4-4 in FIG. 3 with the toggle switch system in a toggle down position.
Figure 4C:
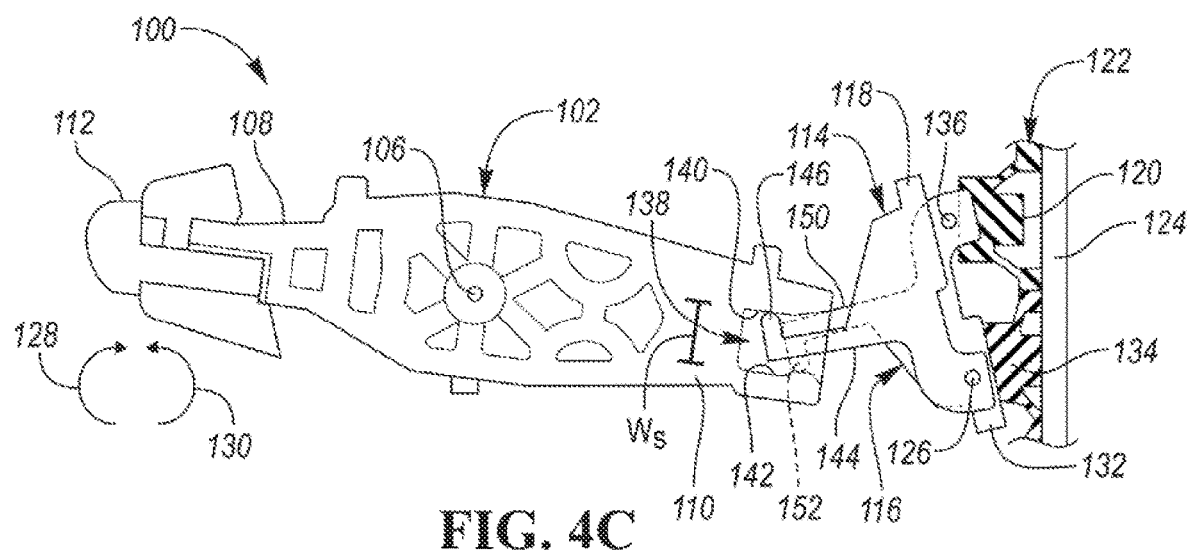
FIG. 4C is a cross-sectional view of the updated embodiment of the toggle switch system taken along line 4-4 in FIG. 3 with the toggle switch system in a toggle up position.

Referring to FIGS. 3-4C, an updated toggle switch system 100 for a vehicle, or more specifically for a vehicle control panel, is illustrated. The toggle switch system 100 may be utilized to activate any number of vehicle functions. For example, the toggle switch system 100 may be utilized to activate functions related to climate control, such as temperature controls (e.g. temperature up or temperature down), fan speed (e.g fan speed up/fan speed down), air recirculation, air conditioning (A/C) mode, etc. The toggle switch system 100 may also be utilized for various audio functions. For example, the toggle switch system 100 may be utilized to seek up/seek down, tune up/tune down, volume up/volume down, search a track list, etc. The toggle switch system 100 may also be utilized to control various multimedia displays (e.g. navigation display, dashboard display, etc.) in the vehicle cabin. In sum, the vehicle functionality of the toggle switch is not limited to any specific vehicle function.

The toggle switch system 100 includes a toggle body 102 that is configured to pivot along an axis 104 of a first pin 106. The first pin 106 may be secured to a static structure such as a housing of the control panel that toggle switch system 100 is a subcomponent of or may be secured directly to a dashboard of a vehicle. The toggle body 102 includes a proximal end 108 and a distal end 110. A toggle cap 112 is disposed on and secured to the proximal end 108 of the toggle body 102. The toggle body 102 may be biased toward a neutral or nominal position (see FIG. 4A) such that the toggle body 102 returns to the neutral or nominal position when it is not being forced into a toggle up position (see FIG. 4B) or a toggle down position (see FIG. 4C). The toggle body 102 may be biased toward the neutral or nominal position via the switches of a rubber switch mat and rocker arms that connect the switches of the rubber switch mat to the toggle body 102, which is described in more detail below. The switches may be biased toward a specific position by a biasing element (e.g., a spring) which is translated by the rocker arms and back to the toggle body 102.

The toggle switch system 100 also includes a first rocker arm 114 and a second rocker arm 116. The first rocker arm 114 includes a first heel 118 that is located along a top end of the first rocker arm 114 and is configured to engage a first electrical switch 120 in order to activate a first vehicle function, which may be any of the functions listed above or any other vehicle function that may be controlled via the toggle switch system 100. The first electrical switch 120 may be a tact switch or may be part of a rubber switch mat 122 that is mounted to an exterior surface of a printed circuit board 124 that controls one or more vehicle functions. For illustrative purposes, the rubber switch mat 122 is shown as a cross-section in FIGS. 4A-4C that includes steps. More specifically, the steps in the cross-sections allow the first electrical switch 120 and the second electrical switch 134 to be illustrated in cross-sectional views even though they are located at different depths within FIGS. 4A-4C. Engagement between the first electrical switch 120 and the printed circuit board 124 initiates control of the first vehicle function.

The first rocker arm 114 may be configured to pivot along an axis of a second pin 126. The second pin 126 may also be secured to a static structure such as the housing of the control panel that toggle switch system 100 is a subcomponent of or to the vehicle dashboard. More specifically, the first rocker arm 114 may be configured to rotate, engage, and activate the first electrical switch 120 in response to rotation of the first rocker arm 114 about the second pin 126 in a first direction 128 that results in the first heel 118 engaging the first electrical switch 120 (see FIG. 4B). Rotation of the first rocker arm 114 in a second direction 130, that is opposite to the first direction 128, results in the first rocker arm 114, or more specifically the first heel 118, disengaging and deactivating the first electrical switch 120. The first rocker arm 114 may be biased via the first electrical switch 120, which may be spring loaded, toward a neutral or nominal position (see FIG. 4A) such that the first rocker arm 114 returns to the neutral or nominal position when it is not being forced into engagement with the first switch 120.

The second rocker arm 116 includes a second heel 132 that is located along a bottom end of the second rocker arm 116 and is configured to engage a second electrical switch 134 in order to activate a second vehicle function, which may be any of the functions listed above or any other vehicle function that may be controlled via the toggle switch system 100. The second electrical switch 134 may be a tact switch or may be part of the rubber switch mat 122 that is mounted to the exterior surface of the printed circuit board 124. Engagement between the second electrical switch 134 and the printed circuit board 124 initiates control of the second vehicle function.

The second rocker arm 116 may be configured to pivot along an axis of a third pin 136. The third pin 136 may also be secured to a static structure such as the housing of the control panel that toggle switch system 100 is a subcomponent of or to the vehicle dashboard. More specifically, the second rocker arm 116 may be configured to rotate, engage, and activate the second electrical switch 134 in response to rotation of the second rocker arm 116 about the third pin 136 in the second direction 130 resulting in the second heel 132 engaging the second switch 134 (see FIG. 4C). Rotation of the second rocker arm 116 in the first direction 128 results in the second rocker arm 116, or more specifically the second heel 132, disengaging and deactivating the second electrical switch 134. The second rocker arm 116 may be biased via the second electrical switch 134, which may be spring loaded, toward a neutral or nominal position (see FIG. 4A) such that the second rocker arm 116 returns to the neutral or nominal position when it is not being forced into engagement with the second switch 134.

The toggle body 102 defines a first slot 138 that extends inward from the distal end 110 of the toggle body 102. The toggle body 102 includes an upper surface 140 and a lower surface 142 that each partially define the first slot 138. The first rocker arm 114 includes a first extension or first protrusion 144 that extends into the first slot 138. A first tab 146 may extend from the first protrusion 144 and partially span the width, $W_s$, of the first slot 138. More specifically, the first tab 146 may span between 60% and 95% the width of the slot, $W_s$. The first tab 146 may be substantially perpendicular to the first protrusion 144. Substantially perpendicular may refer to any incremental value that ranges from exactly perpendicular to 10° from exactly perpendicular (i.e., substantially perpendicular may refer to any value that ranges between 80° and 100°).

The toggle body 102 also defines a second slot 148 that extends inward from the distal end 110 of the toggle body 102. The toggle body 102 includes an upper surface and a lower surface that each partially define the second slot 148. The second rocker arm 116 includes a second extension or second protrusion 150 that extends into the second slot 148. A second tab 152 may extend from the second protrusion 150 and partially span the width of the second slot 148. More specifically, the second tab 152 may span between 60% and 95% the width of the second slot. The second tab 152 may be substantially perpendicular to the second protrusion 150. Substantially perpendicular may refer to any incremental value that ranges from exactly perpendicular to 10° from exactly perpendicular (i.e., substantially perpendicular may refer to any value that ranges between 80° and 100°).

When a user to adjusts the position of the toggle body 102 to the toggle down position by pushing the toggle cap 112 downward (see FIG. 4B), the toggle body 102 is rotated in the second direction 130 such that the distal end 110 of the toggle body 102, or more specifically the lower surface 142 of the toggle body 102 that partially defines the first slot 138, engages the first protrusion 144 and/or first tab 146 of the first rocker arm 114 resulting in the first rocker arm 114 rotating in the first direction 128 such that the first heel 118 engages the first electrical switch 120 to activate the first vehicle function. This also results in the distal end 110 of the toggle body 102, or more specifically the lower surface of the toggle body 102 that partially defines the second slot 148, engaging the second protrusion 150 and/or second tab 152 of the second rocker arm 116 resulting in the second rocker arm 116 rotating in the first direction 128 such that the second heel 132 rotates further away from the second electrical switch 134 relative to the neutral or nominal position.

Retaining the second protrusion 150 and/or second tab 152 of the second rocker arm 116 within the second slot 148, allows the second rocker arm 116 to rotate further in a disengagement direction relative to the neutral or nominal position and maintains an engagement between the toggle body 102 and the second rocker arm 116 when the toggle body 102 is engaging the first rocker arm 114 to active the first switch 120. This ultimately eliminates any impact between the second rocker arm 116 and the toggle body 102 and any undesirable noise that may result from an impact between the second rocker arm 116 and the toggle 102, which may occur in other toggle switch systems when a second rocker arm is returned to the neutral or nominal position from the toggle down position.

When a user to adjusts the position of the toggle body 102 to the toggle up position by pushing the toggle cap 112 upward (see FIG. 4C), the toggle body 102 is rotated in the first direction 128 such that the distal end 110 of the toggle body 102, or more specifically the upper surface of the toggle body 102 that partially defines the second slot, engages the second protrusion 150 and/or second tab 152 of the second rocker arm 116 resulting in the second rocker arm 116 rotating in the second direction 130 such that the second heel 132 engages the second electrical switch 134 to activate the second vehicle function. This also results in the distal end 110 of the toggle body 102, or more specifically the upper surface 140 of the toggle body 102 that partially defines the first slot 138, engaging the first protrusion 144 and/or first tab 146 of the first rocker arm 114 resulting in the first rocker arm 114 rotating in the second direction 130 such that the first heel 118 rotates further away from the first electrical switch 120 relative to the neutral or nominal position.

Retaining the first protrusion 144 and/or first tab 146 of the first rocker arm 114 within the first slot 138, allows the first rocker arm 114 to rotate further in a disengagement direction relative to the neutral or nominal position and maintains an engagement between the toggle body 102 and the first rocker arm 114 when the toggle body 102 is engaging the second rocker arm 116 to active the second switch 134. This ultimately eliminates any impact between the first rocker arm 114 and the toggle body 102 and any undesirable noise that may result from an impact between the first rocker arm 114 and the toggle 102, which may occur in other toggle switch systems when a first rocker arm is returned to the neutral or nominal position from the toggle up position.

It should be understood that the designations of first, second, third, fourth, etc. for rocker arm, pins, electrical switches, heels, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A toggle switch system for a vehicle control panel comprising:
   a first electrical switch configured to activate a first vehicle function;
   a toggle body having a proximal end and a distal end, configured to pivot along an axis that is between the proximal and distal ends, and having upper and lower surfaces that define a slot, the slot having a length that extends inward from the distal end and a width that is perpendicular to the length, the width extending from the upper surface to the lower surface; and
   a rocker arm having,
      a protrusion extending into the slot and in a direction along the length of the slot between the upper and lower surfaces,
      a tab extending from the protrusion, within the slot, and in a direction along the width of the slot, wherein the tab partially spans the width of the slot, and
      a heel that is configured to rotate, engage, and activate the first electrical switch in response to the toggle body moving in a first direction to engage the protrusion with the toggle body within the slot.

2. The toggle switch system of claim 1, wherein the tab is substantially perpendicular to the protrusion.

3. The toggle switch system of claim 1, wherein the tab spans between 60% and 95% the width of the slot.

4. The toggle switch system of claim 1, wherein the toggle defines a second slot that extends inward from the distal end between a second upper surface and a second lower surface, and the toggle switch system further comprises:
  a second electrical switch configured to activate a second vehicle function; and
  a second rocker arm having a second protrusion that extends into the second slot between the second upper surface and the second lower surface and having second heel that is configured to rotate, engage, and activate the second electrical switch in response to the toggle body moving in a second direction to engage the second protrusion with the toggle body within the second slot, wherein the second direction is opposite the first direction.

5. The toggle switch system of claim 4, wherein the second rocker arm includes a tab extending from the protrusion and partially spanning a width of the second slot.

6. The toggle switch system of claim 1, wherein the tab extends from an end of the protrusion.

7. A toggle switch system for a vehicle comprising:
  a first electrical switch configured to activate a first vehicle function;
  a toggle body having a toggle cap disposed along a proximal end, having upper and lower surfaces that define a slot, the slot having a length that extends inward from a distal end and a width that is perpendicular to the length, the width extending from the upper surface to the lower surface, and wherein the toggle body is configured to transition between toggle up and toggle down positions in response to upward and downward movement of the toggle cap, respectively; and
  a rocker arm having,
    a protrusion extending into the slot and in a direction along the length of the slot between the upper and lower surfaces,
    a tab extending from an end of the protrusion, within the slot, and in a direction along the width of the slot, wherein the tab partially spans the width of the slot, and
    a heel that is configured to rotate, engage, and activate the first electrical switch in response to the toggle body being transitioned to the toggle up position to engage the protrusion with the toggle body within the slot.

8. The toggle switch system of claim 7, wherein the tab is substantially perpendicular to the protrusion.

9. The toggle switch system of claim 7, wherein the tab engages the upper surface of the toggle body within the slot when the toggle body is transitioned to the toggle up position.

10. The toggle switch system of claim 7, wherein the toggle body defines a second slot that extends inward from the distal end between a second upper surface and a second lower surface, and the toggle switch system further comprises:
  a second electrical switch configured to activate a second vehicle function; and
  a second rocker arm having a second protrusion that extends into the second slot between the second upper surface and the second lower surface and having a second heel that is configured to rotate, engage, and activate the second electrical switch in response to the toggle body being transitioned to the toggle down position to engage the second protrusion with the toggle body within the second slot.

11. The toggle switch system of claim 10, wherein the second rocker arm includes a tab extending from the protrusion and partially spanning a width of the second slot.

12. The toggle switch system of claim 11, wherein the tab engages the second lower surface of the toggle body within the slot when the toggle body is transitioned to the toggle down position.

13. A toggle switch system for a vehicle comprising:
  first and second electrical switches configured to activate first and second vehicle functions, respectively;
  a toggle body having a toggle cap disposed along a proximal end and defining first and second slots that extend inward from a distal end between upper and lower surfaces;
  a first rocker arm having a first protrusion that extends into the first slot and having a first heel that is configured to rotate, engage, and activate the first electrical switch in response to an upward movement of the toggle cap to engage the first protrusion with the toggle body within the first slot; and
  a second rocker arm having a second protrusion that extends into the second slot and having a second heel that is configured to rotate, engage, and activate the second electrical switch in response to a downward movement of the toggle cap to engage the second protrusion with the toggle body within the second slot.

14. The toggle switch system of claim 13, wherein the first rocker arm includes a tab extending from the first protrusion and partially spanning a width of the first slot.

15. The toggle switch system of claim 14, wherein the tab is substantially perpendicular to the first protrusion.

16. The toggle switch system of claim 14, wherein the tab spans between 60% and 95% the width of the first slot.

17. The toggle switch system of claim 14, wherein the second rocker arm includes a tab extending from the second protrusion and partially spanning a width of the second slot.

18. The toggle switch system of claim 17, wherein the tab spans between 60% and 95% the width of the second slot.

* * * * *